Jan. 2, 1962   J. M. CHAPMAN   3,015,167
LIQUID LEVEL
Filed Dec. 18, 1957   2 Sheets-Sheet 1
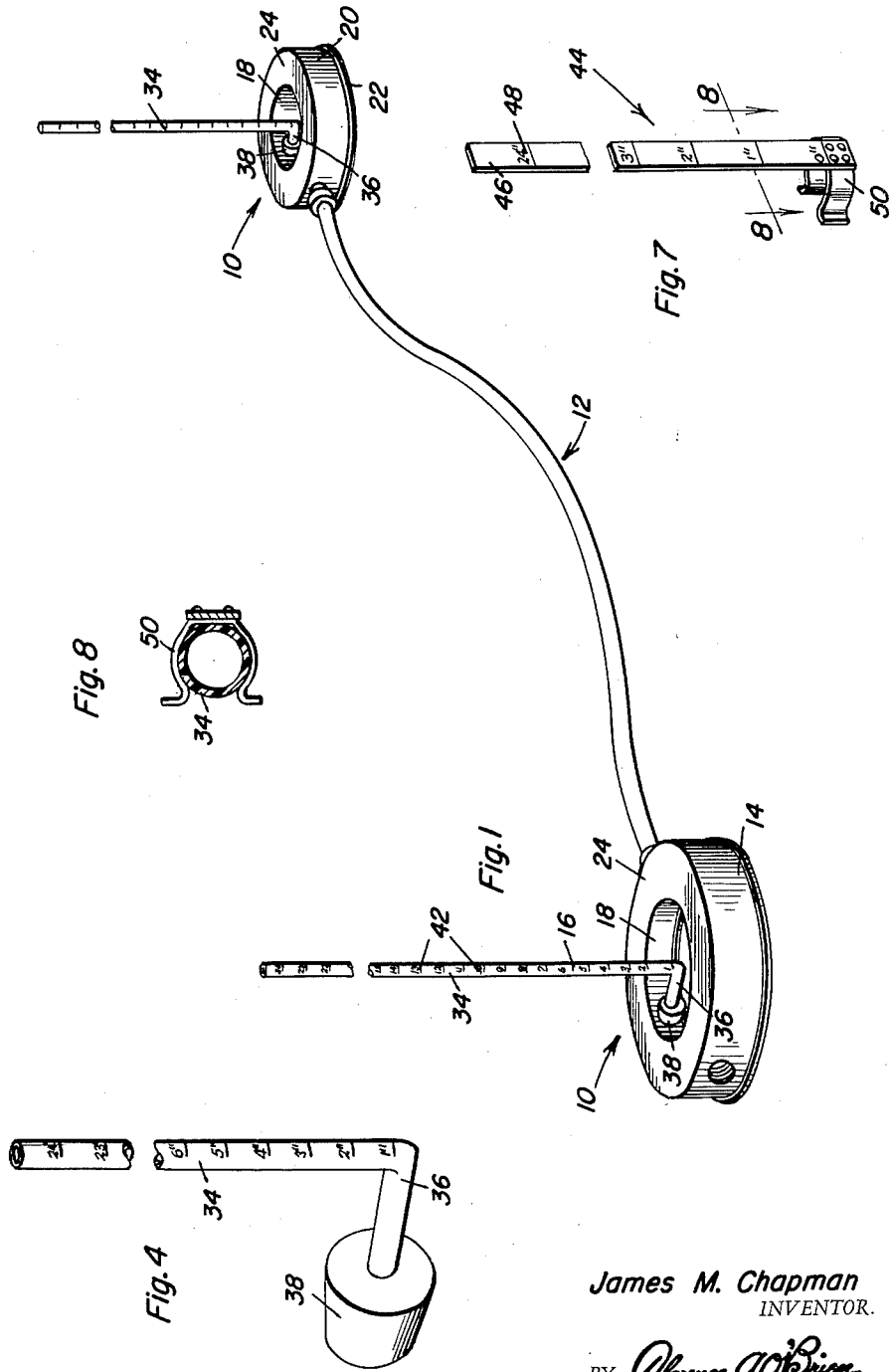
James M. Chapman
INVENTOR.

Jan. 2, 1962
J. M. CHAPMAN
3,015,167
LIQUID LEVEL
Filed Dec. 18, 1957
2 Sheets-Sheet 2
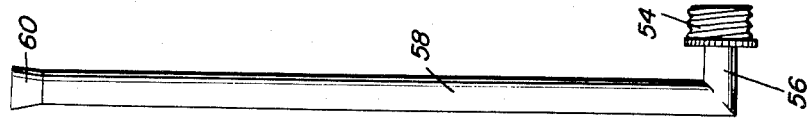
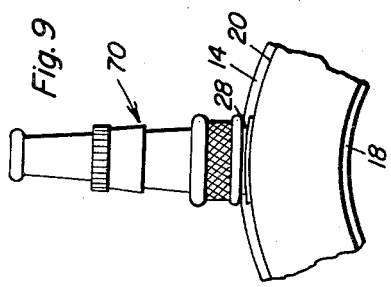
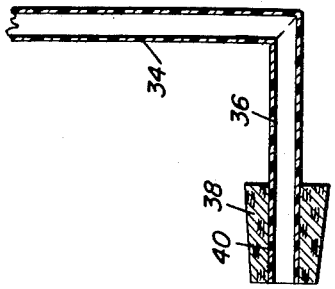
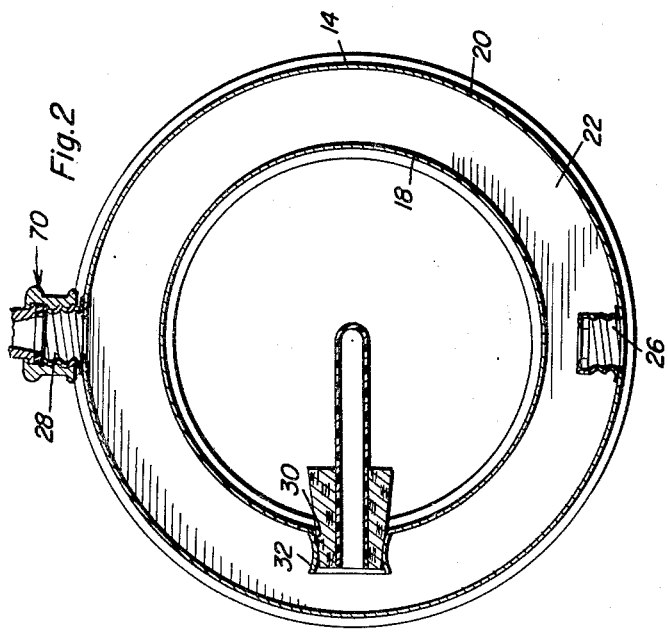
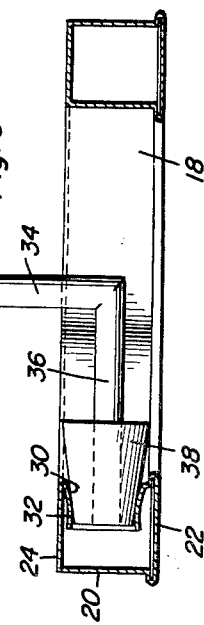
James M. Chapman
INVENTOR.
BY *Clarence A. O'Brien
and Harvey B. Jackson*
Attorneys United States Patent Office 3,015,167
Patented Jan. 2, 1962

3,015,167
LIQUID LEVEL
James M. Chapman, 108 Ricardo, Waycross, Ga.
Filed Dec. 18, 1957, Ser. No. 703,573
8 Claims. (Cl. 33—209)

This invention relates generally to devices for determining the difference in elevation between two points, and more particularly to a liquid level.

The primary object of this invention is to provide a liquid level which is quickly and readily used by a layman for determining the difference in elevation between two points.

Another object of this invention is to provide a device of the character described whereby an extremely simple device may be used to perform a task which previously in the art required expensive equipment and a skilled operator to use the equipment.

Still a further object of this invention is to provide a liquid level using water as a medium so that when the level is to be used, it may be filled with a fresh supply of water, which may be drained therefrom when it is no longer to be used in that water is quickly and cheaply available.

Still a further object of this invention is to provide a device of the character described wherein means are provided for adding water when no garden hose or such type of source is available. A funnel-like element is used to add water to the device when water must be poured from a container or a bucket into the level.

Still a further object of this invention is to provide a simple and inexpensive device yet one which is exceedingly effective for the purpose for which it is designed.

This invention contemplates the use of a plurality of containers which have upstanding tubes communicating these containers with the atmosphere. These containers are filled with water and are communicated with each other by means of hosing. Thus, any time one of the containers is placed at a higher elevation than another, since water seeks its own level, the water in the lower container will rise and give a reading in the tube and the difference in elevation between the two containers may be obtained by comparing the readings of the containers. Also provided with this device is a funnel-like attachment, so that water may be added to the device when a garden hose is not immediately available. Furthermore, a tube ruler is provided which may be clipped onto the tubes and aligned with the level of water in a tube, so that if it is desired that one of the containers be located at the specified elevation above or below the other, the tube ruler will give a direct reading of how much more or less of an elevation is required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the containers, tubes and hosing comprising the present invention, illustrating its use on a grade;

FIGURE 2 is a horizontal sectional view taken substantially through the mid-point of the container, illustrating details of construction thereof;

FIGURE 3 is a vertical sectional view taken along a diameter of one of the containers;

FIGURE 4 is a perspective view of one of the tubes to be used in conjunction with the present invention;

FIGURE 5 is a vertical sectional view taken through the tube illustrated in FIGURE 4;

FIGURE 6 is a side elevational view of a funnel attachment to be used with the present invention when a water hose and source of water is not immediately available;

FIGURE 7 is a perspective view of a tube ruler which may be clipped on to one of the tubes for further convenience in use;

FIGURE 8 is a vertical sectional view taken substantially along the plane defined by reference line 8—8 of FIGURE 7; and FIGURE 9 is a partial elevational plan view of the nozzle to be used in conjunction with the present invention.

Referring now more specifically to the drawings, the numeral 10 generally designates the container and tube attachment comprising the level, when a hose 12 is connected therebetween. The level is constructed of a container 14 and a plastic tube 16 connected thereto.

The container 14 is constructed of an inner circular wall 18, and an outer circular wall spaced and concentric therewith, these walls being connected together by a large washer-shaped bottom 22, and a washer-shaped top 24, whereby a container is thus formed. A female water fitting 26 is connected in outer wall 20, so that a conventional garden hose may be connected thereto from a water source when it is desired to fill the liquid level with water. On the other side of the container and also formed in wall 20, is a male fitting 28, to which may be connected a hose, so that a first container may be connected to a second container. It is to be noted that while female fitting 26 on a first container would be connected to a water source, on the succeeding containers, this fitting would accommodate the male portion of a garden hose, so that all of the containers will communicate with each other. An opening 30 is punched through inner circular wall 18, in such a manner as to form a circumferential flange 32 defining this opening on the inner surface thereof, whereby a plug or cork may be accommodated.

The tubes 16 are constructed of a vertical member 34 extending upwardly for a considerable height. Connected to the lower end of vertical portion 34, is a short horizontal portion 36, which is engaged in a central bore 40 which is formed through a tapered plug 38. Plug 38 is inserted into opening 30 with a vertical member 34 projecting upwardly therefrom, when the device is placed into the in use position.

In use, the plug 38 is to be inserted into opening 30 in the inner wall 18 of container 14. The vertical portion 34 of the tube may have measuring indicia 42 thereon, so as to more accurately measure the difference in elevation between two of these containers. Two containers would then be spaced from each other and connected together by means of a hose 12 which would be connected between the male fitting 28 of one container and the female fitting 26 of another container. The last container would have the open fitting closed by means of a plug or cap or preferably a water nozzle which may be used to conveniently adjust the water level in the tubes, and the first container would be connected by means of a water hose to a source of water. Then, the water would be turned on so that the first container would be filled with water and thence the water would flow through hose 12 into the second container. When the water has completely filled or at least more than half way filled each of the containers, the water supply may be shut-off, and the fitting connected thereto would be closed. A water hose nozzle 70 may be threaded onto male fitting 28 and opened slightly to permit water to drain therefrom and result in a lowering of the water level in the system. When the desired level has been reached the nozzle may be closed. It is to be noted that when water is in the containers, depending on the amount of water allowed to flow into the system, the water will also flow into the vertical portion 34 of plastic tube 16 and an initial reading may be taken therefrom. However, if it is not desired to take an initial reading at the start, a tube ruler or scale 44 may be used. This ruler is constructed of a flat vertically extending plate 46 having measuring indicia 48 thereon. At the lower end of said ruler 44, is connected a spring clip 50. The spring clip 50 may be snapped into place onto a vertical portion 34 of tube 16, with the zero line of the ruler being level with the water line in the tube. Then, the other container would be moved to a position so that the elevation between the two points may be measured. When the second container is moved to a higher elevation, the water trying to seek its own level will rise in the first container, and the direct reading may be taken on tube ruler 44, since the water level was originally at zero. For instance, if the second container is moved to a location which is twelve inches higher than the first container, then the water level in the first container should give a reading on twelve inches upon the tube ruler 44. When more than two containers are to be used, then by setting each tube ruler on each tube at the same setting indicated on the tube with the lowest water level, the difference in elevation of this tube and all the other may be read directly on each of the other tube rulers.

It is to be noted that if an immediate source of water is not available, a funnel attachment 52 may be used. This funnel attachment has a male fitting 54 thereon, to which is connected a short horizontal section 56 and thence a long vertical section 58 atop which is a cone-shaped funnel 60. The fitting 54 would be screwed into the female fitting 56 of one of the containers. Then water may be poured from buckets, glasses, or any suitable water carrier into the funnel 60, and thus the water may be added to the system.

It may now be seen that I have herein shown and described a new and improved type of liquid level system for giving accurate indications of the difference in elevation between two points, using both simple and inexpensive means so that the layman can afford such a system and easily learn to use one.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A liquid level system comprising at least one pair of hollow liquid containers constituting bases, upwardly extending tubes pivotally connected to said bases for rotation about horizontal axes communicating each container with the atmosphere, a flexible means communicating the interiors of said containers, said system being closed except for said tubes, and containing a sufficient supply of liquid whereby liquid will seek its own level and determine points of identical elevation in each of said tubes.

2. The combination of claim 1 including at least one female and at least one male fitting formed in each of said containers, said communicating means comprising a hose having a male coupling on one end and a female coupling on the other end engaged with a female fitting of one container and a male fitting of the other container of each pair of containers.

3. A liquid level system comprising at least one pair of hollow liquid containers constituting bases, upwardly extending tubes pivotally connected to said bases for rotation about horizontal axes communicating each container with the atmosphere, a flexible means communicating the interiors of said containers, said system being closed except for said tubes, and containing a sufficient supply of liquid whereby liquid will seek its own level and determine points of identical elevation in each of said tubes, at least one female and at least one male fitting formed in each of said containers, said communicating means comprising a hose having a male coupling on one end and a female coupling on the other end engaged with a female fitting of one container and a male fitting of the other container of each pair of containers, said containers being annular in plan outline, said tubes being pivotally mounted through the innermost walls of said containers.

4. The combination of claim 3, wherein fittings are formed on the outermost walls of said containers.

5. The combination of claim 4, wherein said fittings are disposed on opposite sides of said containers.

6. The combination of claim 5, wherein one of said inlet fittings is connected to a source of water to fill said system and one of said outlet fittings is provided with a valve to lower the liquid level in said tubes to a predetermined point without the raising or lowering of either of said tubes.

7. The combination of claim 6, including a vertically adjustable graduated tube scale having a spring clip thereon mounted upon one of said tubes.

8. The combination of claim 7, including a funnel attachment comprising a vertical pipe section having an enlarged upper end, a lower end terminating in a horizontal section, and a male fitting on one end of said horizontal section engageable with said female intake fittings whereby said system may be filled with liquid by pouring said liquid from a container into said enlarged end.

References Cited in the file of this patent

UNITED STATES PATENTS

| | | |
|---|---|---|
| 532,949 | Darragh | Jan. 22, 1895 |
| 914,945 | Gutwein | Mar. 9, 1909 |
| 965,659 | Russell | July 26, 1910 |
| 1,566,174 | Tyler | Dec. 15, 1925 |
| 2,382,525 | Wellington | Aug. 14, 1945 |
| 2,804,692 | Karstens | Sept. 3, 1957 |
| 2,814,127 | Blatchford | Nov. 26, 1957 |

FOREIGN PATENTS

| | | |
|---|---|---|
| 793,463 | France | Nov. 23, 1935 |